United States Patent [19]

Byers

[11] 4,400,066

[45] Aug. 23, 1983

[54] MOUNTING AND PRECISION DRIVE SYSTEM FOR ASTRONOMICAL TELESCOPE, AND THE LIKE

[76] Inventor: Edward R. Byers, 29001 W. Hwy. 58, Barstow, Calif. 92311

[21] Appl. No.: 270,590

[22] Filed: Jun. 4, 1981

[51] Int. Cl.³ .............................................. G02B 23/16
[52] U.S. Cl. .................................................. 350/568
[58] Field of Search ..................... 350/82, 83, 85, 567, 350/568

[56] References Cited

U.S. PATENT DOCUMENTS

| | | | |
|---|---|---|---|
| 988,642 | 4/1911 | Korrodi et al. | 350/85 |
| 2,326,552 | 8/1943 | Morse | 350/568 |
| 3,136,388 | 6/1964 | Jolly | 350/83 X |
| 3,951,511 | 4/1976 | Parsons | 350/83 |

FOREIGN PATENT DOCUMENTS 604292  5/1960  Italy ....................................... 350/83

Primary Examiner—John K. Corbin
Assistant Examiner—Matthew W. Koren
Attorney, Agent, or Firm—Keith D. Beecher

[57] ABSTRACT

A precision equatorial mounting unit and drive system for an astronomical telescope is provided which is constructed so that the mounting, per se, is modular and may be easily and quickly converted to a German equatorial platform for mounting different sizes and types of telescopes, or to a fork mount likewise for different sizes and types of telescopes. The drive system includes a worm gear sector drive to provide a highly accurate sidereal tracking system in a minimum of space. The mounting unit includes a built-in adjustable timer with a calibrated scale, and an automatic cut-off; the unit also includes a precision latitude adjustment and associated plumb bob scale which may be calibrated directly in latitude.

5 Claims, 8 Drawing Figures

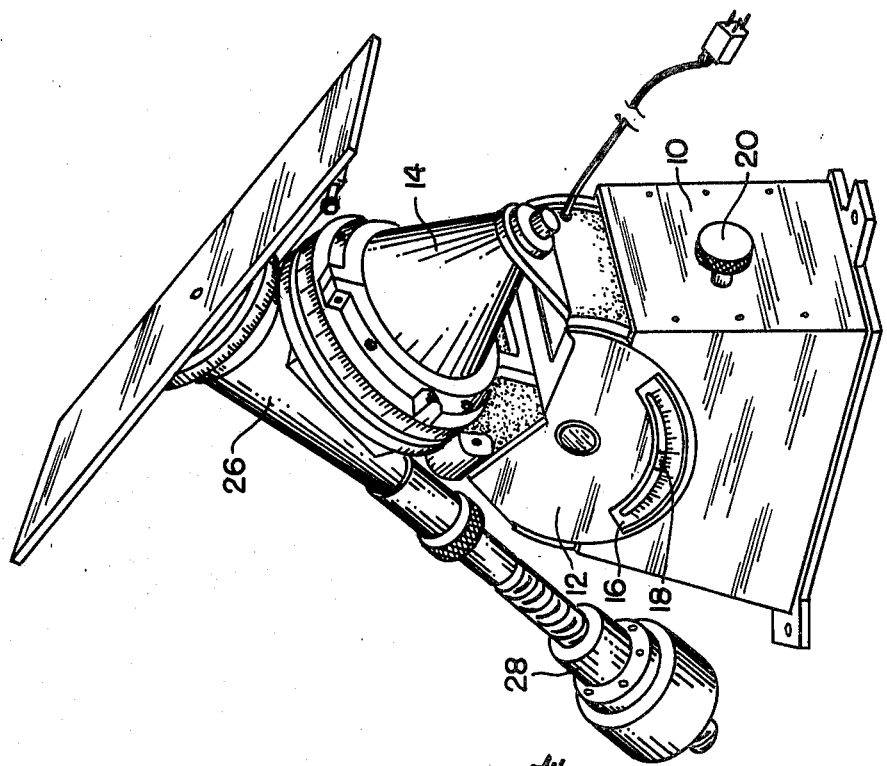
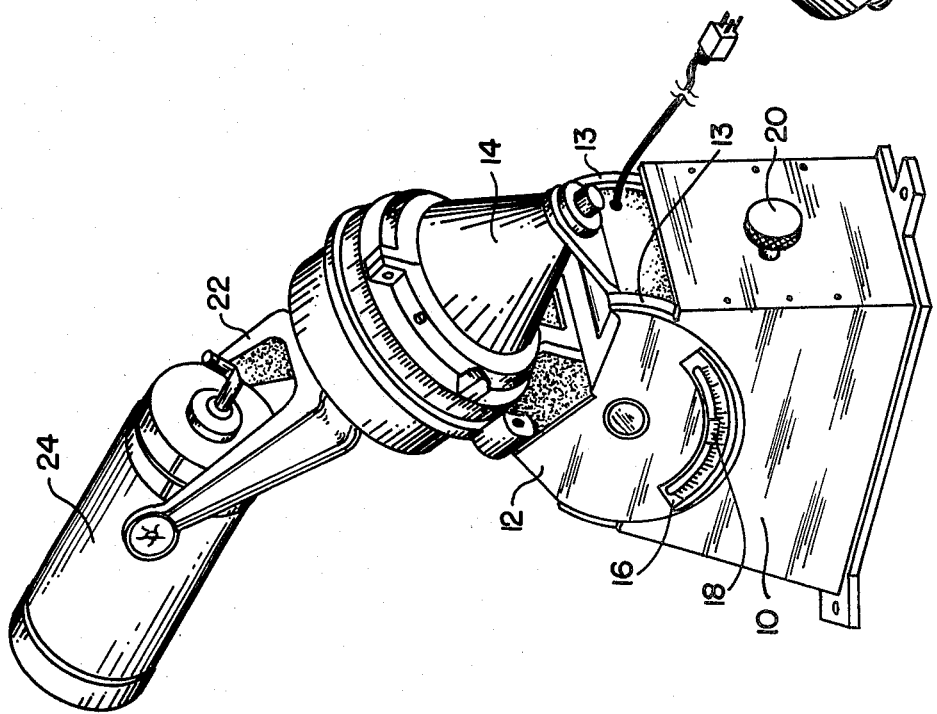

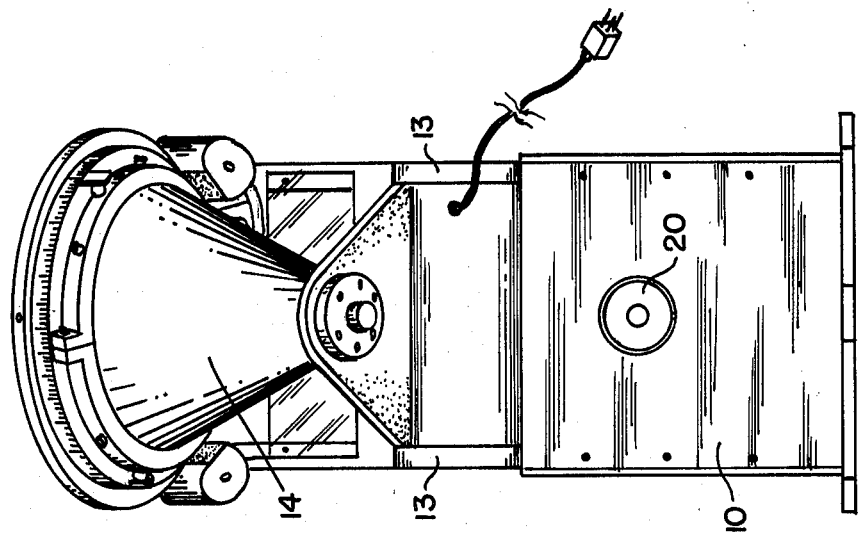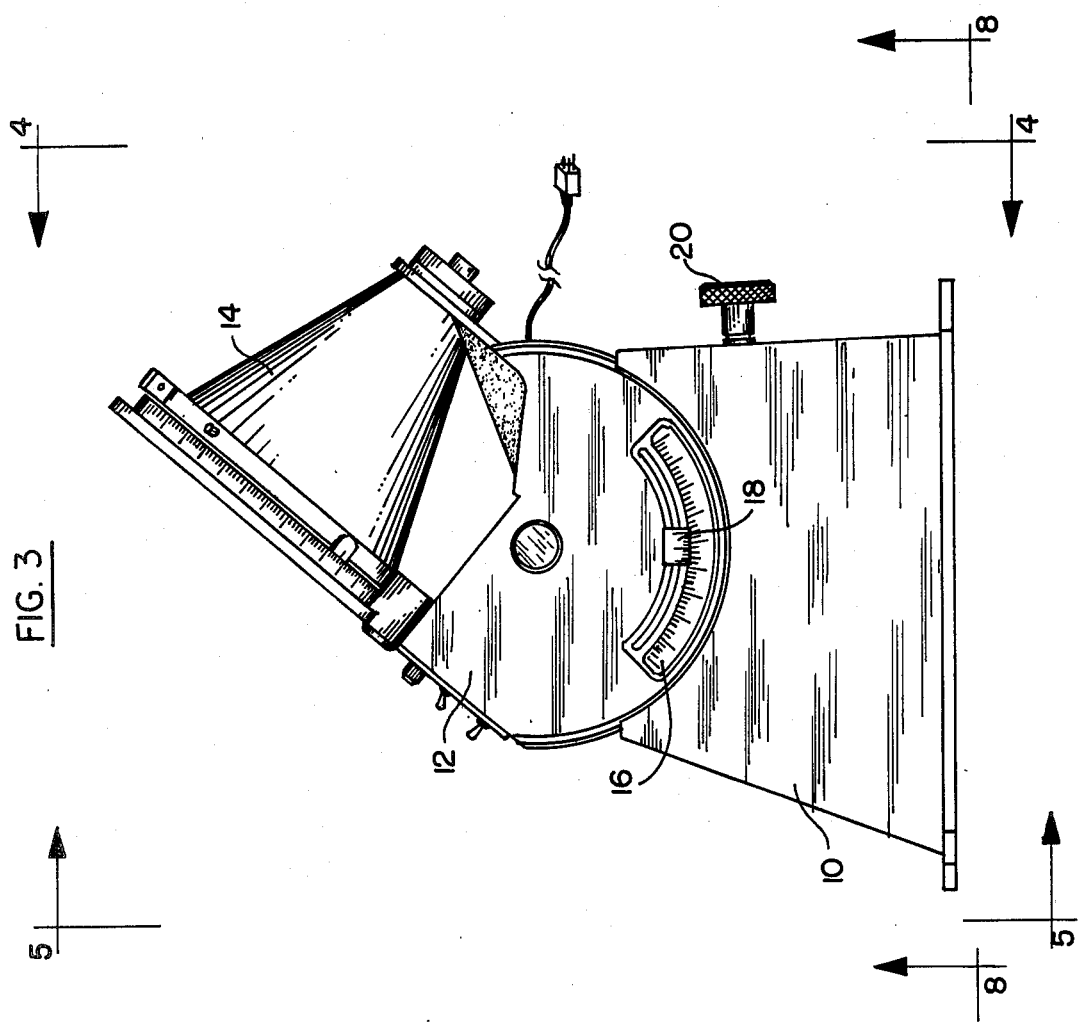

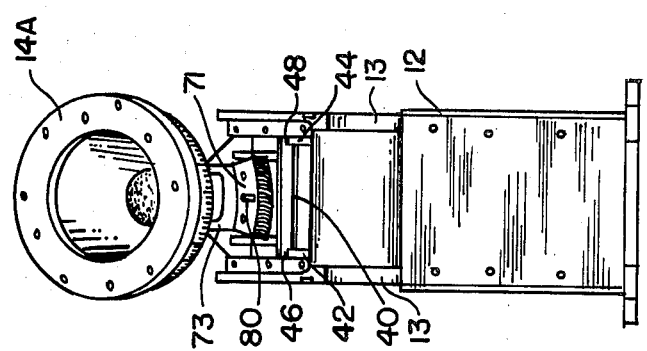
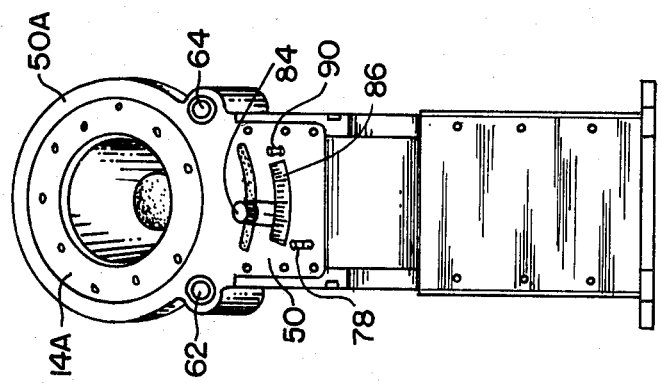

MOUNTING AND PRECISION DRIVE SYSTEM FOR ASTRONOMICAL TELESCOPE, AND THE LIKE

BACKGROUND

There are many instances in the use of astronomical telescopes in which it is necessary or desirable to rotate the telescope on its polar axis at a constant rate. For example, because of the rotation of the earth, it is necessary to rotate a telescope on its polar axis at a substantially constant rate of one revolution per day when making long time studies or photographs of celestial bodies.

A variety of telescope-mounting systems have been devised. One of the most common telescope mounting systems is known as the equatorial mount. The equatorial mount embodies a two axis system having an inclined rotational axis which parallels the earth's rotational axis, and having a second rotational axis which intersects the first axis at right-angles. The inclined axis is referred to as the polar axis and the other axis is referred to as the declination axis. Rotation of the mounting unit about the declination axis adjusts the declination angle of the telescope. Rotation of the mounting unit about the polar axis moves the telescope in a rotary tracking motion. The equatorial mounting system is advantageous for the reason that it permits tracking of celestial objects by simple rotation about the polar axis which is fixed at a given angle corresponding to the latitude at which the telescope is located.

Accordingly, the most common astronomical telescope mounting unit is the equatorial platform one in which the telescope is mounted for rotation about the polar axis which is parallel to the celestial polar axis, and for rotation about the declination axis which is perpendicular to the polar axis. Such mounting units commonly include a motor for rotating the telescope about its polar axis at a rate of one revolution per day to track the observed celestial object as it rotates about the celestial pole, the latter rotation being the visible effect of the earth's rotation about its axis.

For smaller and medium size telescopes, as mentioned above, the most common form of mounting unit is the German equatorial platform on which the bearings for the declination assembly are attached outboard of the upper bearing of the polar axis assembly and the telescope is, in turn, attached outboard of the declination axis bearing. A counterweight is mounted at the opposite end of the declination shaft so as to maintain balance in all positions of rotation about the polar axis. While this type of mounting unit has the advantage of being fairly light, it suffers from the disadvantage that large mechanical stresses are placed on the shafts. It is therefore necessary to make the shafts sufficiently strong to resist vibration and to place the two bearings fairly well apart to insure stability.

A second equatorial mounting assembly which eliminates the need for the counterweight is the fork type. In the fork mounting, the polar axis is similar to that in the German equatorial mount, but the telescope is carried between the declination axis bearings in a fork through which it is swung to gain complete accessibility to the sky. Although the counterweight and heavy declination shaft have been eliminated in the latter assembly, the fork itself must be of a massive structure thereby requiring a substantial polar axis assembly to support the load.

Examples of astronomical telescope mounting units and drive systems of the type described above may be found, for example, in U.S. Pat. Nos. 2,326,552; 3,136,388; 3,603,664; 3,606,520; 3,751,134; 3,840,284; 3,885,858 and 3,893,746.

The objectives of the present invention are to provide an improved and inexpensive astronomical telescope mounting unit and drive system of the German equatorial or fork type, in which an astronomical telescope is rotated about the polar axis at a desired rate by a motor which is coupled through a worm to a worm gear sector, rather than to an entire worm gear. This technique permits high precision accuracy to be achieved between the worm and the worm gear sector by utilizing relatively large effective worm gear diameter, and since only a worm gear sector, rather than an entire worm gear is used, space is conserved.

Unlike the prior art drives, the rotation of the telescope about the polar axis in the unit of the invention is not continuous, but is limited to a particular time interval during which the worm moves the worm gear sector from one of its ends to the other. If the observation process cannot be completed within that particular time interval, the segment must be reset. The time interval can extend, for example, up to two hours, which is sufficient for most observations and astronomical photographs. However, if more time is required, such as for photographing a faint distant star, the worm gear can be reset on the worm in a matter of seconds. The worm is preferably made of special proprietary bronze alloy so as to have molecularly stable high precision threads.

A microswitch is provided, as will be described, to permit the observation process to be terminated automatically at any set time within the aforesaid time interval, so that there is no need to monitor the time continually. A five minute prealarm, for example, may also be provided by the same or a different microswitch to tell the operator that the instrument is nearing the end of the preset time interval.

The mount of the invention is manually adjustable about a horizontal axis perpendicular to the polar axis so that it may be set to correspond to the latitude at which the instrument is used. A plumb bob scale is provided which may be calibrated directly in latitude, so as to facilitate the adjustment of the instrument.

As will be described, the assembly of the invention has a modular construction, so that it may be used as a German equatorial or fork mount to accommodate a variety of sizes and types of telescopes, merely by removing, for example, four screws.

BRIEF DESCRIPTION OF THE DRAWINGS

FIG. 1 is a perspective view of the mounting assembly of the invention used in conjunction with a fork-type of mount;

FIG. 2 is a perspective view of the mount assembly of the invention used in conjunction with a German equatorial platform type of mount;

FIG. 3 is a side elevational view of the assembly of the invention with the particular mounts of FIGS. 1 and 2 removed;

FIG. 4 is a rear view of the assembly of FIG. 3;

FIG. 5 is a front elevational view of the assembly of FIG. 3;

FIG. 6 is a front view of a cone which is included in the mount of the invention, and which is rotated about the polar axis, and of a gear segment for driving the cone;

DETAILED DESCRIPTION OF THE ILLUSTRATED EMBODIMENT

Figure 8:
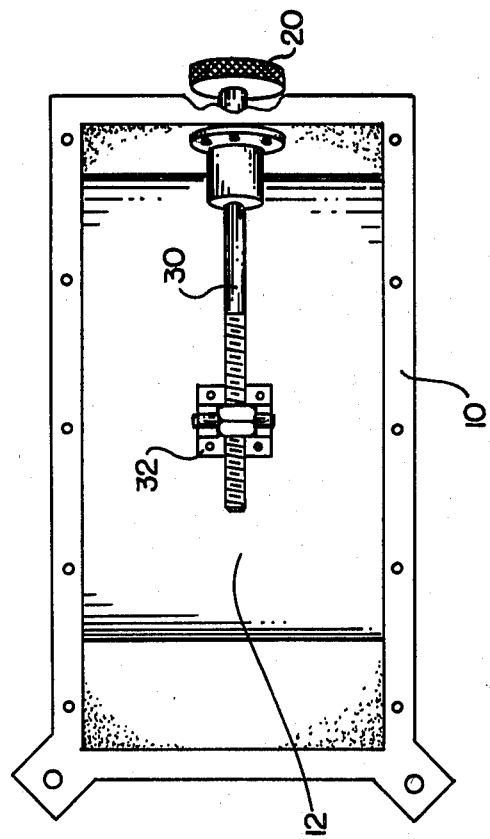
FIG. 8 is a bottom view of the assembly taken along the lines 8—8 of FIG. 3, and showing a manual drive for rotating the drum-like portion of FIG. 7 about the declination axis, to set the drum to an angular position corresponding to the latitude at which the instrument is to be used.

The instrument of the invention, as shown, for example, in FIGS. 1 and 2, includes a base 10, and a drum 12. Drum 12 is movable angularly in base 10 about a horizontal axis perpendicular to the polar axis and rides on a pair of side rails 13. A cone 14 is rotatably supported on the drum 12, and cone 14 is rotatable about the polar axis. A scale 16, calibrated, for example, directly in latitude is provided on the side of drum 12, and a plumb bob index 18 moves across the scale as the drum 12 is adjusted in latitude by rotation of knob 20.

A flange is provided around the outer edge of cone 14, which is best shown in FIGS. 5 and 6, and which is designated 14A. Different types of telescope mounts may be attached to the end of the cone 14, and are held in place, for example, by four screws. As shown in FIG. 1, a fork-type of mount 22 may be mounted on the end of cone 14 and it may support, for example, a Schmidt-Cassegrain (Celestron 8 or other popular fork-mounted telescope) telescope 24.

As shown in FIG. 2, the mount 22 and telescope 24 may be replaced by a German equatorial mount 26, merely be removing the four screws, and screwing in the German Declination Assembly. A variety of telescopes may be supported, for example, on the platform of the German equatorial mount. A counterweight 28 is threaded into the end of the declination assembly 26. A counterweight is made removable to assist in the portability of the overall assembly.

In FIGS. 3-6, the telescope mount has been removed, so that the additional features of the drive system may be more clearly shown. As illustrated in FIG. 8, for example, the drum 12 is rotated to change the inclination of the polar axis when a shaft 30 is rotated by knob 20. The end of shaft 30 is threaded into a bracket 32 which is attached to the drum, so that when the shaft 30 is turned, the drum likewise is rotated, with the drum being turned about a horizontal axis at a right angle to the polar axis.

The plumb bob sub-assembly is best shown in FIG. 6, in which the front panel and bearing ring of the mount have been removed. The plumb bob sub-assembly includes a shaft 40, with two plumb bobs 42 and 44 being attached to the opposite ends of the shaft by set screws 46 and 48. The plumb bobs extend downwardly, and are free to rotate with the shaft 40 about the horizontal axis. The plumb bobs, therefore, maintain an upright vertical position as the drum 12 is turned. The index 18 is attached to the lower end of plumb bob 44, and is viewed through the side of the drum, as shown in FIGS. 1 and 2. The advantage of the plumb bob sub-assembly is that the mount does not need to be levelled in order to read the inclination of the polar axis.

In the operation of the instrument, the knob 20 is turned, to turn drum 12 about a horizontal axis at right angle to the polar axis, until the index 18 is set adjacent the calibration on the scale 16 corresponding to the latitude at which the instrument is used.

The instrument includes a front panel 50 which includes an integral annular ring 58 which, in turn, surrounds the forward end of cone 14. A pair of bearings 62 and 64 are mounted on the ring, and these provide bearing surfaces for the cone.

Figure 7:
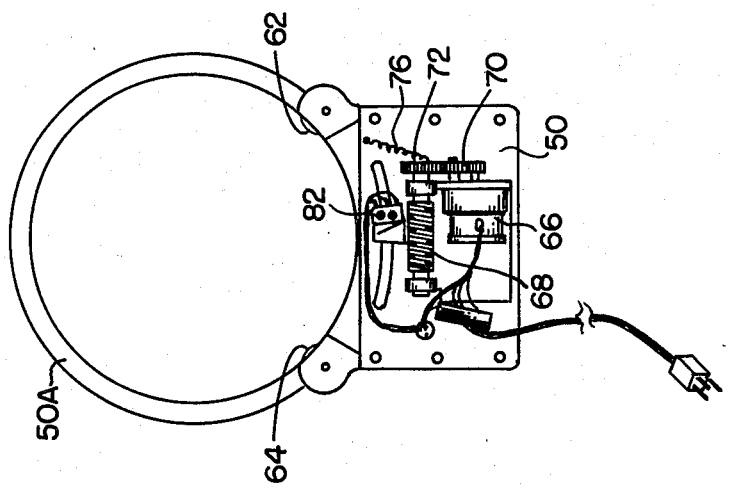
FIG. 7 is a rear view of a sub-assembly, including a ring and bearings for the cone of FIG. 6, and which is intended to surround and support the cone; the drive motor for the cone, and of a worm which engages the gear segment of FIG. 6.

An electric motor 66 (FIG. 7) is mounted on the rear side panel 50, and the motor drives a worm 68 through gears 70 and 72, which are coupled to the drive shaft of the motor. The worm, in turn, engages a worm gear sector 71 which is mounted on the cone 14 by a bracket 73 (FIG. 6). When the panel 50 and ring 50A are in place, as shown in FIG. 5, the worm engages the sector, and is held in engagement by a spring 76. When the motor 66 is engaged, the worm 68 causes the worm gear sector 71 to move across the worm from one end to the other. When the end of the worm gear sector is reached, the cone can be reset, by pulling lever 78 (FIG. 5) downwardly so as to release the worm gear sector 71 from the worm, and by then turning the cone manually back to its original position.

A pin 80 is mounted on the worm gear sector 71, as shown in FIG. 6. As the gear sector is moved by the worm, the pin 80 moves and ultimately engages a microswitch 82, to de-energize motor 66. The microswitch may be moved, to establish the time during which the cone is rotated about the polar axis, this being achieved by loosening a knob 84 (FIG. 5) and by moving the knob in its slot, which moves the microswitch accordingly. A scale 86, calibrated in hours and minutes, for example, is provided, so that a desired time interval may be set up.

Accordingly, if, for example, a one hour observation time is desired, the knob 84 is set to one hour on the scale 86. The motor 66 is energized, causing worm 68 to move the worm gear sector 73, and the cone 14 to rotate about the polar axis. This action continues until the pin 80 engages microswitch 82, and de-energizes the motor.

For longer periods of time, the knob 84 is adjusted to the maximum, for example, two hours on scale 86. The motor is then energized, and the sector 71 is moved until the pin 80 engages switch 82 at the end of the two hour period. Lever 78 is then moved downwardly to disengage the worm from the sector, and the cone 14 is turned back to the initial position of gear sector 73, and the process is repeated. The process may, in this manner, be continued for as long as is desired.

A switch 90 on the panel 50 (FIG. 5) turns the motor on or off.

The invention provides, therefore, an improved telescope mount and drive system which is modular in nature, so that it can be used for mounting and driving a wide variety of telescope types and sizes. The drive system of the instrument is highly accurate, since it uses a precision machined worm and worm gear sector with effectively large diameter for accuracy purposes, the use of the sector instead of an entire gear permitting such accuracy at less expense, and with less space then the usual prior art assemblies. The drive system, in a manner unique in the art, also provides the timing standard for the telescope mount, for example, one gear tooth per four minutes of time.

The telescope mounting and drive system of the invention also includes a manual knob adjustment control for turning the instrument about the declination axis to correspond to the geographical latitude of the observed site, and a simple plumb bob type of indicator, permitting the operator to set the instrument at the desired angle, corresponding to the particular latitude, independently of the level of the mount. Also, the mounting and drive system of the invention includes a simple and readily adjustable timer, which can be set to turn off the drive motor after any predetermined time interval.

It will be appreciated that while a particular embodiment of the invention has been shown and described, modifications may be made, and it is intended in the claims to cover all modifications which come within the true spirit and scope of the invention.

What is claimed is:

1. A mount for supporting a telescope for angular movement about a polar axis and a declination axis, said mount comprising: a base; a first member mounted on said base for rotation about a horizontal axis; a second member mounted on said first member for rotation about a polar axis; a drive motor mounted on said first member; a worm coupled to the drive motor to be driven thereby; a worm gear sector mounted on said second member in position to be engaged by said worm to enable the drive motor to turn said second member through a predetermined arc about said polar axis; a resilient member for holding said worm in engagement with said worm gear sector; and manually operable means for moving said worm against the force of said spring away from said worm gear sector to disengage said worm from said worm gear sector.

2. A mount for supporting a telescope for angular movement about a polar axis and a declination axis; said mount comprising: a base; a drum mounted on said base for rotation about a horizontal axis; a second member mounted on said drum for rotation about a polar axis, said second member having a conical configuration with a large end and a small end; a drive motor mounted on said drum; a worm coupled to the drive motor to be driven thereby; and a worm gear mounted on said second member in position to be engaged by said worm to enable the drive motor to turn said second member through a predetermined arc about said polar axis; a front panel mounted on said drum; an annular member integral with said front panel surrounding the large end of said second member and forming a support for said second member; a pin mounted on said worm gear sector, and a switch mounted on said front panel to be engaged by said pin after a predetermined time interval following the energization of said drive motor.

3. The mount defined in claim 2, and which includes bearing means for the second member mounted in said annular member for permitting free rotation of said second member in said annular member.

4. The mount defined in claim 3, in which said switch may be set in different positions on said front panel to establish different predetermined time intervals.

5. A mount for supporting a telescope for angular movement about a polar axis and a declination axis, said mount comprising: a base; a first member mounted on said base for rotation about a horizontal axis; a second member mounted on said first member for rotation about a polar axis; a drive motor mounted on said first member; a worm coupled to the drive motor to be driven thereby; a worm gear sector mounted on said second member in position to be engaged by said worm to enable the drive motor to turn said second member through a predetermined arc about said polar axis; manually operable means for turning said first member to predetermined angular positions around said declination axis; a scale mounted on said first member; and plumb bob means mounted in said first member and including an indexed member movable along the scale for indicating the angular position of said first member with respect to said declination axis.

* * * * *